Jan. 29, 1935.                 C. H. PARKER                 1,989,459
            RETORT FOR THE DISTILLATION OF SOLID CARBONACEOUS SUBSTANCES
                        Filed April 26, 1928      6 Sheets-Sheet 1
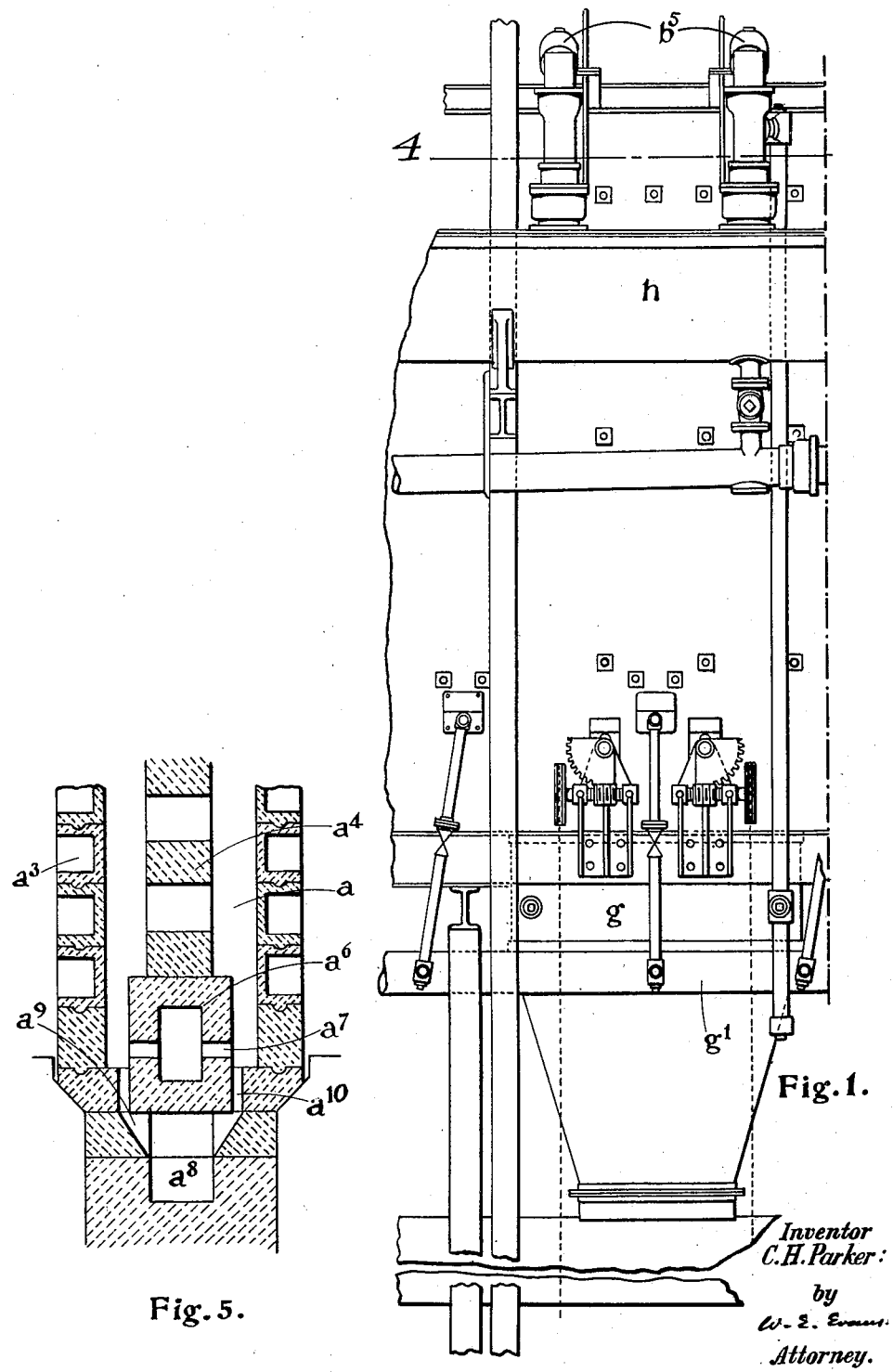
Fig. 5.                                                   Fig. 1.
Inventor
C. H. Parker:
by
W. E. Evans
Attorney.

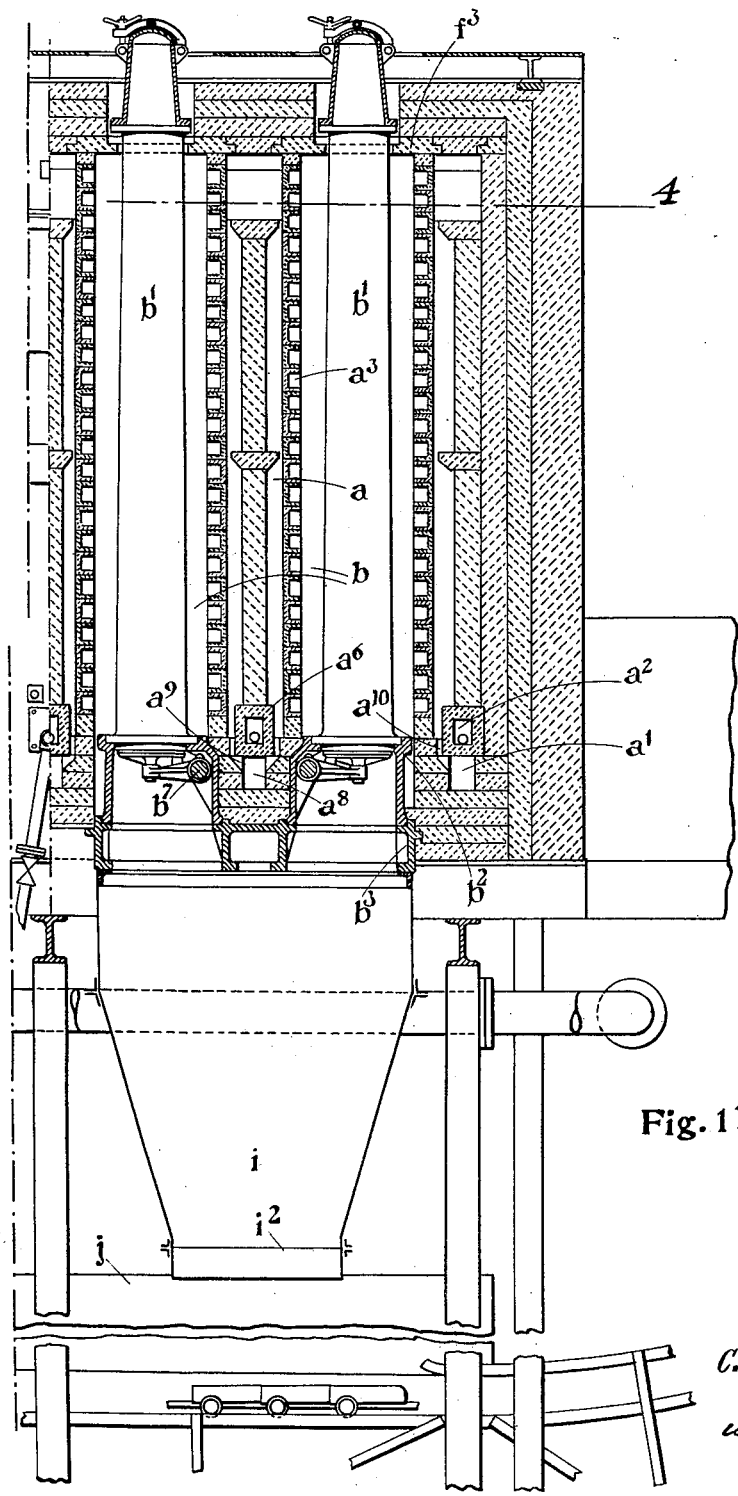
Fig. 1.A

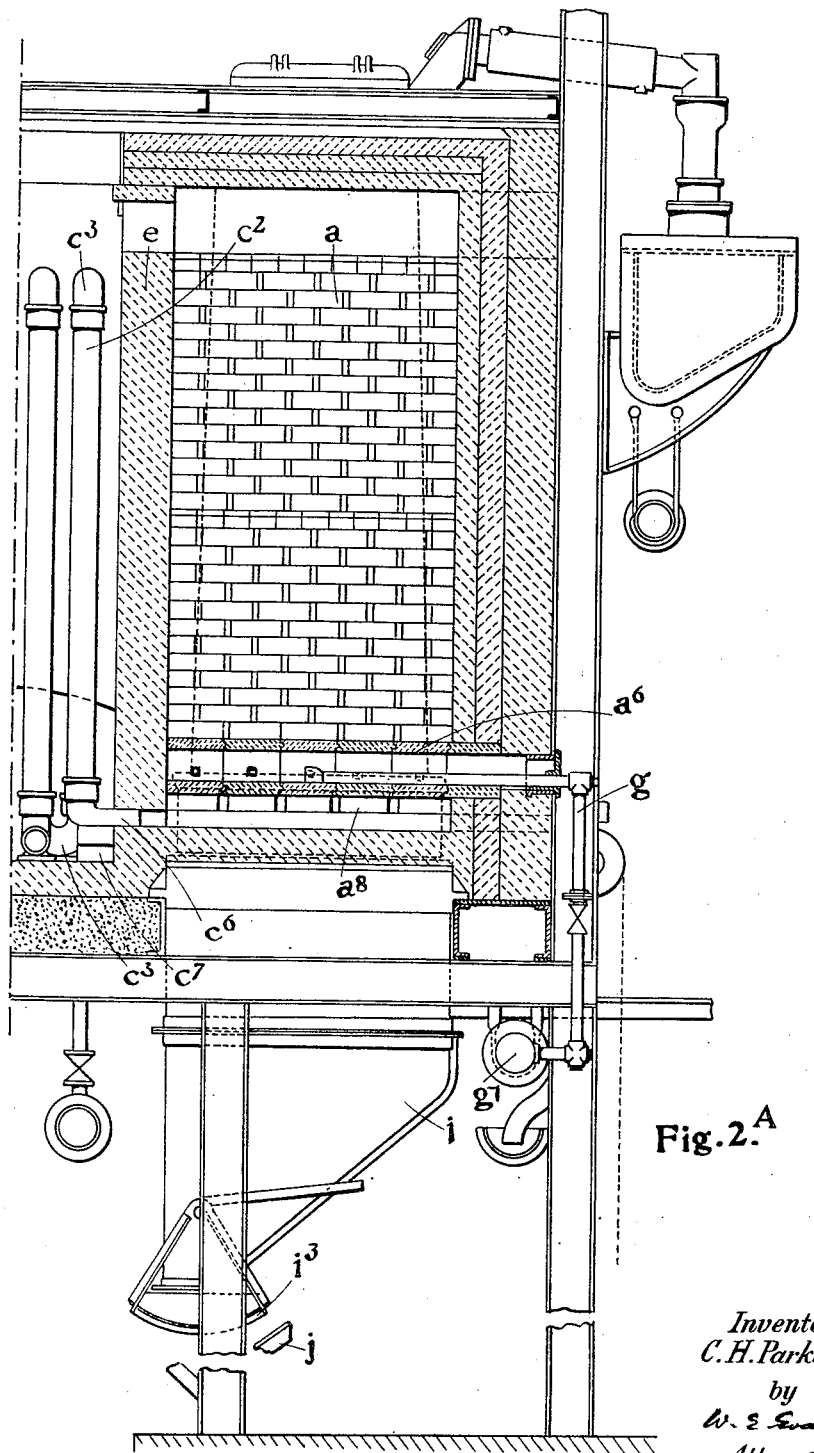

Patented Jan. 29, 1935

1,989,459

UNITED STATES PATENT OFFICE 1,989,459

RETORT FOR THE DISTILLATION OF SOLID CARBONACEOUS SUBSTANCES

Charles Henry Parker, Codsall, England, assignor to Low Temperature Carbonisation Limited, London, England Application April 26, 1928, Serial No. 273,089
In Great Britain April 27, 1927

9 Claims. (Cl. 202—114)

This invention relates to retorts for the distillation or carbonization of solid carbonaceous substances, such as coal, and the invention has among its objects to construct a setting by which heat may be simply and effectively applied to the retorts and with economy in the utilization of the gaseous fuel employed, and in such manner that the respective parts of the plant, such for example, as the retorts and recuperators, may be conveniently mounted in the setting and be capable of convenient withdrawal when repairs or renewals are to be made.

The invention has for an especial object to ensure the substantially uniform and economic application of heat to the walls of the retorts.

The invention is especially applicable to vertical retorts of oblong cross-section that are disposed in parallel series in the same setting and in which the retorts are charged and discharged periodically.

According to the invention the setting is provided with two series of alternate retort chambers and substantially co-extensive combustion chambers and with a series of recuperator chambers in position beside the series of retort chambers and combustion chambers, one series of recuperator chambers being advantageously provided for two adjacent and parallel series of alternate retort and combustion chambers.

According to the invention, moreover, the combustion chambers consist of a vertically disposed massive central wall and two parallel lateral walls on each side of the central wall, and so disposed as to leave at each side of the central wall a space extending the length of the combustion chamber up which the flames and the hot gases may pass. The central wall is advantageously perforated, while the lateral walls of the combustion chambers are provided of box bricks, that is to say, of bricks having a cavity disposed at one of their sides, the cavities of the bricks being all disposed in the lateral walls in position opposite to the respective retorts.

According to the invention the brickwork at the base of the central and lateral walls of the combustion chambers is provided with a horizontally disposed air inlet passage into which heated air may be admitted from a pipe recuperator disposed in the adjacent recuperator chamber, while in position, immediately above a horizontally disposed gas passage may extend at the lower part of the combustion chamber and gas may be discharged therefrom into the spaces between the central and lateral walls of the combustion chamber through passages provided at intervals.

According to the invention, moreover, the recuperator may conveniently take the form of a series of parallel pipes connected together by bends at the adjacent upper ends and by suitable bends formed as base supporting fittings at the lower end, so that thus a recuperator is constructed of a zigzag form into which, at the lower end, air from an air supply pipe may be admitted to which it may be supplied by a fan, while the last lengths of the pipes of the recuperator may be provided with fittings by which the air is forced into the air inlet passage hereinbefore referred to, which is disposed beneath the central wall of the respective combustion chambers, so that thus each recuperator may supply heated air to the adjacent oppositely disposed combustion chambers of the parallel series.

According to the invention, moreover, such a recuperator is so mounted within the recuperator chamber that free expansion of the parts of the recuperator may take place and that the parts may be readily exchanged or inspected.

The invention further comprises the features of construction hereinafter described.

A construction of setting comprising retort chambers, combustion chambers, and recuperator chambers, in accordance with the invention is illustrated in the accompanying drawings by way of example.

Figures 1 and 1A are an elevation of the setting, partly in section on the line 1—1 of Figure 4.

Figures 2 and 2A are a cross-sectional elevation on the line 2—2 of Figure 4.

Figure 5 is a detail sectional view, to an enlarged scale, of the lower portion of one of the combustion chambers.

Figure 2:
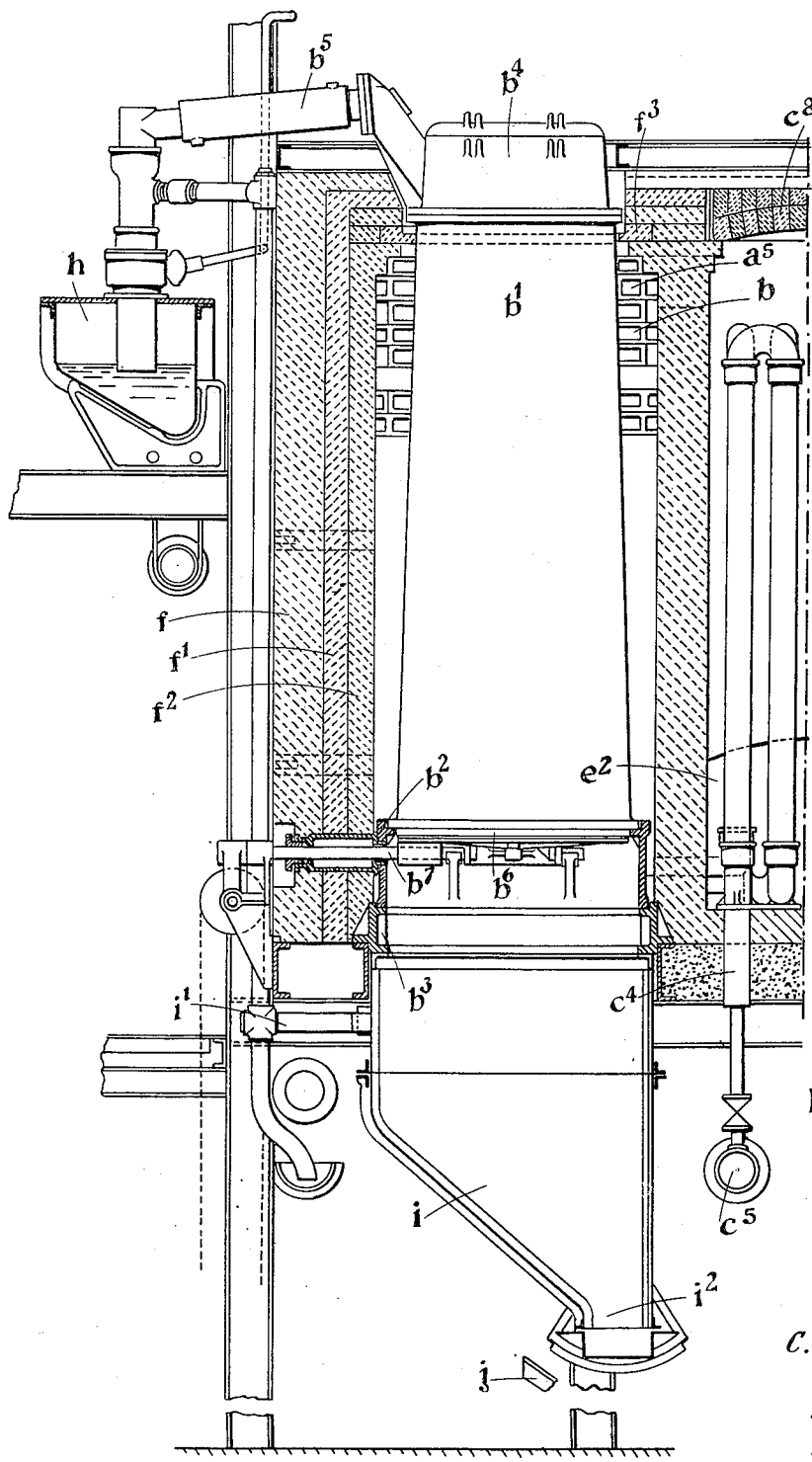
Figure 3:
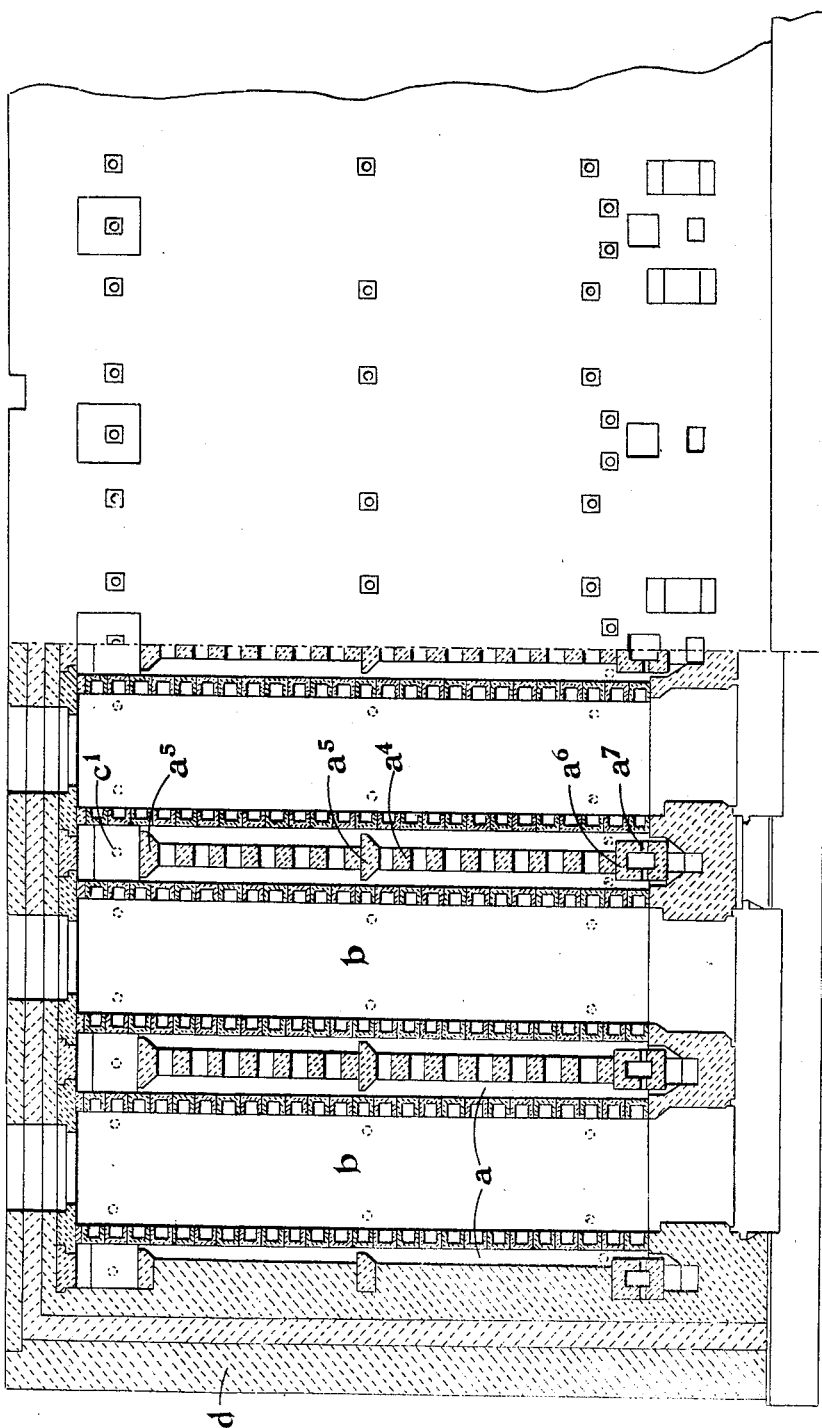
Figure 3 is an elevation, partly in section on the line 3—3 of Figure 4.
Figure 4:
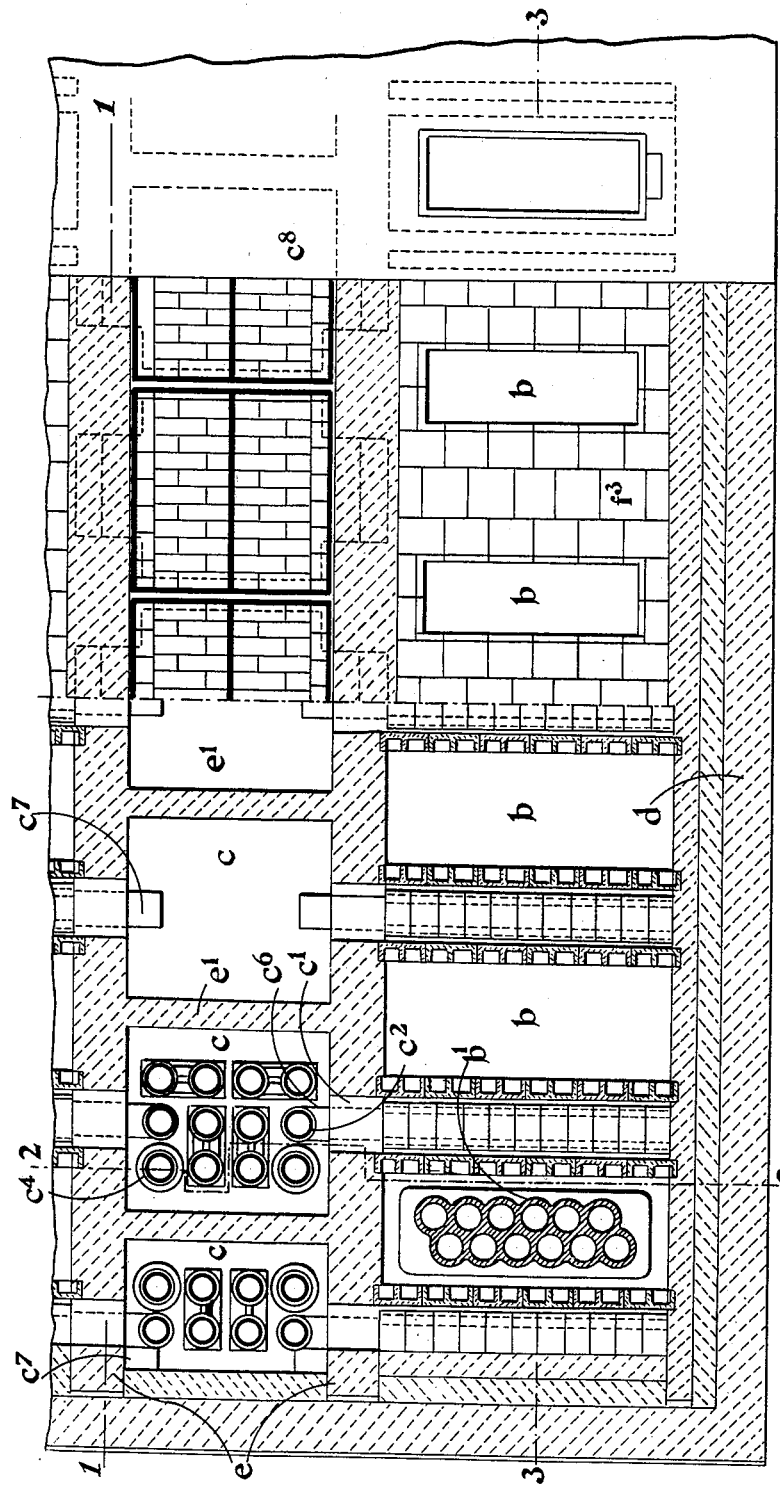
Figure 4 is a sectional plan on the line 4—4 of Figure 1.

In carrying the invention into effect, in accordance with the construction represented in the drawings, the setting is provided of substantially rectangular form and is built of brickwork upon a suitable metal framework. It comprises two series of alternate combustion or heating chambers $a$ and retort chambers $b$, with an intermediate series of recuperator chambers $c$. The combustion chambers and recuperator chambers are arranged in communication, in such manner that the gases of combustion from the combustion chambers pass into the recuperator chambers, and thence away to a chimney or chimneys provided in determined positions advantageously at one end of the setting through which the waste gases eventually pass from the recuperator chambers, the recuperators serving for the pre-heating of the combustion air by the waste heat of the combustion gases and the residual waste gases which are discharged at a relatively low temperature.

The retort and combustion chambers are alternately disposed one beside the other in series between the outer walls $d$ of the setting and two parallel disposed longitudinal intermediate walls $e$ spaced apart, and tied by transverse walls $e^1$, disposed at intervals to form the recuperator chambers $c$. Ports or passages $c^1$ are provided at the upper ends of the recuperator chambers $c$ communicating with the upper ends of the adjacent and oppositely disposed combustion chambers $a$, while the transverse walls $e^1$ between the respective recuperator chambers are formed at the lower ends with openings $e^2$ below arches serving for the support of the walls $e^1$, whereby communication is made between the respective recuperator chambers $c$ and with the chimney by which the waste gases pass away. The retorts $b^1$ which advantageously comprise units, each consisting of a number of integrally formed tubular retort chambers, are mounted within the retort chambers $b$ upon metal base fittings $b^2$, and the adjacent base fittings $b^2$ are carried in pairs upon metal supporting frame parts $b^3$ mounted upon the metal framework of the setting. The air passages $a^1$ and gas passages $a^2$ of the combustion chambers are formed in the manner hereinafter described, of brickwork substantially supported by the supporting frame parts $b^3$ and disposed between the base fittings $b^2$. The lateral walls A of the combustion chambers, which serve as heat transmission walls between the combustion chambers and the retort chambers, to heat the latter, are built of tiers of hollow box bricks $a^3$ of rectangular formation, that is to say, of bricks each having a cavity formed therein, the bricks being disposed with their side and end walls in abutting engagement with each other and so that their cavities open through that side of the wall facing the adjacent retort chambers, while the thin walls forming the bottoms of the cavities in the bricks are located at the side of the wall A facing adjacent the combustion chambers. By such an arrangement of the bricks, thin partitions are thus presented at the closed sides of the cavities between the combustion chambers and the retort chambers through which the heat can be conducted rapidly, thus obviating the necessity of a high temperature difference between the combustion chambers and the retort chambers and facilitating the transmission of heat between the same. The box bricks $a^3$ are advantageously tied with or built at intervals into the end walls of the retort chambers. The bricks also may be so set that at intervals communicating openings are provided adjacent the said walls, that is to say, the outer walls $d$, and the intermediate walls $e$, forming passages between the retort chambers and the combustion chambers. The combustion chamber further comprises a centrally disposed wall serving as a reservoir or accumulator of heat, and comprising superposed courses of refractory bricks $a^4$, the bricks in each course being spaced apart to form openings through the wall. The said wall terminates at the level of the passages $c^1$ communicating with the recuperator chambers $c$, and is formed at the head with a course of bricks $a^5$ which extend in proximity with the surface of the lateral walls formed by the bricks $a^3$. A similar course of bricks $a^5$ may be advantageously provided at an intermediate position in the height of the wall.

The middle wall of the combustion chamber is supported at the foot upon suitably shaped hollow blocks of rectangular cross-section $a^6$ which serve for the formation of the gas inlet passage of the combustion chamber. The said blocks $a^6$ are advantageously provided in sections or lengths having, on opposite vertical end faces respectively, grooves and ribs by which a positive engagement or interlocking of adjacent blocks may be effected when they are brought into position in line to form a continuous passage. Each block is provided in the lateral walls with an outlet $a^7$ by which the gas may pass into the combustion chamber. The gas passage is formed in position immediately above the air passage in the setting, the blocks $a^6$, by which the gas passage is formed being supported at opposite sides by the brickwork which is spaced apart as at $a^8$ for the formation of the air passage. The air passage extends horizontally throughout the width of the combustion chamber, and at intervals upwardly directed passages $a^9$ are formed which are continued as passages $a^{10}$ at the sides of the lower parts of the blocks $a^6$, where the said blocks are seated between brickwork supporting the lateral walls of the combustion chamber. The gas outlets $a^7$ are advantageously disposed adjacent or intermediate of the air passages $a^{10}$. The lower part of the respective spaces between the middle wall and the lateral walls of the combustion chambers is contracted by the blocks $a^6$, of which the gas passage is formed, and the gas and air pass upwardly through the restricted space, the hot gases being deflected against the lateral walls by the upwardly protruding portions of the bricks $a^5$.

As illustrated in Figure 5, the box bricks $a^3$ of which the lateral walls are formed are advantageously provided on their opposite upper and lower faces respectively with grooves and ribs, so that a positive engagement of the bricks is ensured. The bricks of which the walls and setting are built, however, are secured together by a luting of refractory character.

The outer walls of the setting are preferably formed of red brick as at $f$, lined with non-conducting brickwork $f^1$, which in turn is lined with fire-brick $f^2$ forming the outer end walls of the combustion and retort chambers. At the upper ends the retort and combustion chambers are closed by similar brickwork lined with interlocking tiles $f^3$ which are adapted to embrace the upper ends of the retort and are provided in such manner that they may be readily removed.

Each recuperator is formed of a heating coil comprising a series of parallel pipes $c^2$ connected together in pairs by bends $c^3$, the bends at the lower end being provided with base plates by which the recuperator elements may be supported upon the floor of the recuperator chamber. In this manner the recuperator affords a zig-zag path for the combustion air which is introduced through the inlet fitting $c^4$ from the air supply pipe $c^5$ to which it may be supplied by a fan. The air is discharged from the recuperator into the air passage $a^8$ by way of the discharge fitting $c^6$ which is provided with an outlet of rectangular form to correspond with the opening provided in the wall $e$ leading to the air passage. The fitting $c^6$ is supported upon a brickwork pedestal $c^7$. It will be understood that each recuperator chamber contains two sets of pipes forming the recuperator, each set serving to supply the air passage of one of the two adjacent combustion chambers. By the construction of the recuperator in the manner described, the recuperator elements are permitted to expand freely and at the same time the parts of the recuperator may be readily inspected or exchanged. The recuperator chambers are closed at the upper end by arched covers $c^8$ comprising metal frames filled with brickwork, two such covers advantageously serving to close each recuperator chamber.

It will be understood that by the arrangement of combustion chambers, retort chambers, and recuperator chambers hereinbefore described, means are provided whereby heat is uniformly applied to the walls of the retorts at opposite sides, and whereby the residual heat of the hot gases is effectively utilized in preheating the combustion air by the downward passage through the recuperator chambers of the hot gases on their discharge from the combustion chambers.

In the case of the combustion chambers at the ends of the settings, in place of the middle wall, there may be provided a corresponding lining of fire-brick within the fire-brick lining $f^2$ before referred to, and positioned above the gas passage $a^2$. Thus the said combustion chambers are provided only with one combustion space, and the gas and air are discharged only from one side of the transversely disposed gas and air inlet passages. The gas supply to the gas passages, formed by the blocks $a^6$, is effected by way of piping $g$ provided with suitable valves and connected to a gas supply pipe $g^1$. The delivery portion of the pipe $g$ may extend to the middle of the width of the combustion chamber. Alternative arrangements for the delivery of gas may, however, be provided.

The retorts $b^1$ are closed at the upper end by hoods $b^4$ from which the gas off-take $b^5$ is carried to the hydraulic main $h$, while the lower ends of the retorts are closed by cover plates $b^6$ adapted to swing about spindles $b^7$ for the delivery of the treated charge into a closed receptacle $i$ in which the distillation may be continued and completed, or in which the charge may be cooled. The said chamber $i$ may be provided with a gas off-take $i^1$ adapted to deliver gas into the hydraulic main $h$. The oppositely disposed receptacles $i$ have their respective outer faces inclined inwardly towards an outlet $i^2$ closed by a pivoted closure plate $i^3$. The outlets $i^2$ of the oppositely disposed receptacles are adapted to deliver the contents of the receptacles on to inclined delivery plates $j$, whence the treated charge may be delivered on to a conveyor or into trucks for removal.

I claim:—

1. A furnace of the character described having a retort chamber, a combustion heating chamber therefor, and a heat transmission wall separating said chambers, said wall being built of tiers of hollow bricks, the cavities in the bricks being open at the side of the wall facing the retort chamber and closed at the side of the wall facing the combustion chamber so as to reduce the cross-sectional thickness of the bricks at the latter-named side of the wall.

2. A furnace of the character described having a retort chamber, a combustion heating chamber therefor, and a heat transmission wall separating said chambers, said wall being built of tiers of hollow bricks, the cavities in said bricks extending a major portion of the length and breadth of the bricks and opening outwardly through one side of the wall and closed at the opposite side of the wall so as to reduce the cross-sectional thickness of the bricks at the latter-named side of the wall.

3. A furnace of the character described having a pair of spaced retort chambers and an intervening combustion chamber, and heat transmission walls separating the combustion chamber from the respective retort chambers, each of said walls comprising tiers of rectangular bricks provided with cavities opening outwardly at the side of the wall facing the adjacent retort chamber and being closed at the side of the wall facing the combustion chamber and reducing the cross-sectional thickness of the bricks at the latter-named side of the wall.

4. A furnace of the character described having a retort chamber, a combustion heating chamber therefor, a heat transmission wall separating said chambers, said wall being built of tiers of bricks each provided with a cavity extending a major portion of the breadth of the bricks and opening outwardly through one side of the wall and closed at the opposite side of the wall so as to reduce the cross-sectional thickness of the bricks at the latter-named side of the wall, a heat storing baffle wall of material thickness extending from the bottom of the combustion chamber a major portion of the distance toward the top of the combustion chamber in parallel relation to and spaced from the heat transmission wall, and baffling means carried by said heat storing baffle wall and projecting into the space between the same and the heat transmission wall to retard the flow of combustion gases through said space and deflect the same against the heat transmission wall.

5. A furnace of the character described having a retort chamber, a combustion heating chamber therefor, a heat transmission wall separating said chambers, said wall being built of tiers of bricks each provided with a cavity extending a major portion of the breadth of the bricks and opening outwardly through one side of the wall and closed at the opposite side of the wall so as to reduce the cross-sectional thickness of the bricks at the latter-named side of the wall, a heat storing baffle wall of material thickness extending from the bottom of the combustion chamber a major portion of the distance toward the top of the combustion chamber in parallel relation to and spaced from the heat transmission wall, and baffling members projecting at different elevations from the heat storing baffle wall into the space between the same and the heat transmission wall to retard the flow of combustion gases through said space and deflect the same against the heat transmission wall.

6. A furnace of the character described having a pair of spaced retort chambers, a combustion heating chamber for the retort chambers disposed between said retort chambers, a heat transmission wall separating the combustion heating chamber from each retort chamber, said wall being built of tiers of bricks each provided with a cavity extending a major portion of the length and breadth of the bricks and opening outwardly through one side of the wall and closed at the opposite side of the wall so as to reduce the cross-sectional thickness of the bricks at the latter-named side of the wall, a heat storing baffle wall of material thickness extending from the bottom of the combustion heating chamber a major portion of the distance toward the top of said chamber in parallel relation to and spaced from the heat transmission walls, and baffling means carried by said heat storing baffle wall and projecting into the spaces between said walls and the heat transmission walls to retard the flow of combustion gases therethrough and deflect the same against the heat transmission walls.

7. A furnace of the character described having a pair of spaced retort chambers, a combustion heating chamber for the retort chambers disposed between said retort chambers, a heat transmission wall separating each retort chamber from the combustion chamber, said wall being built of tiers of bricks each provided with a cavity extending a major portion of the length and breadth of the bricks and opening outwardly through one side of the wall and closed at the opposite side of the wall so as to reduce the cross-sectional thickness of the bricks at the latter-named side of the wall, a heat storing baffle wall of material thickness extending upwardly from the bottom of the combustion heating chamber a major portion of the distance toward the top of said chamber in parallel relation to the heat transmission walls and spaced therefrom, said heat storing baffle wall being provided with transverse openings for the flow of combustion gases therethrough between said spaces, and baffling means upon said heat storing baffle wall projecting into said spaces to retard the flow of the combustion gases therethrough and deflect the same against the heat transmission walls.

8. A furnace of the character described having a pair of retort chambers, a combustion heating chamber for the retort chambers disposed between said retort chambers, a heat transmission wall separating the combustion chamber from each retort chamber, a heat storing baffle wall of material thickness extending from the base of the combustion heating chamber upwardly a major portion of the distance toward the top of said chamber and disposed therein in parallel relation to and spaced from the heat transmission walls, a brickwork base forming a bottom support for the heat transmission walls and having an air supply conduit formed therein, and a gas fuel supply conduit comprising hollow blocks resting on said brickwork base and having gas supply ports communicating with the bottom portions of the spaces between the heat transmission and heat storing baffle wall, said brickwork base being provided with air supply passages leading from the air supply conduit to and communicating with the bottom portions of said spaces on opposite sides of the fuel gas supply conduit.

9. A furnace of the character described comprising a row of vertical retort chambers and combustion heating chambers therefor arranged in alternation with each other, each combustion heating chamber being separated from the adjacent retort chambers by interposed heat transmission walls, retorts in the retort chambers, a metallic frame forming a base support for the retorts in adjacent retort chambers, a base support of brickwork for the heat transmission walls of the intervening combustion chamber carried by said frame support, said brickwork support having an air supply conduit formed therein and provided with spaced air supply passages leading therefrom to the bottom of the combustion heating chamber, a fuel gas supply conduit comprising hollow blocks resting upon the brickwork base between said air supply passages and provided with ports communicating at opposite sides thereof with the bottom of the combustion chamber, and a heat storing baffle wall of material thickness resting on said blocks and extending therefrom upwardly into the combustion chamber a major portion of the distance toward the top of said chamber in parallel relation to and spaced from the heat transmission walls.

CHARLES HENRY PARKER.